Nov. 13, 1928.
R. W. TADD
1,691,364
VALVE CONNECTER FOR DELIVERY TUBES
Filed April 18, 1927
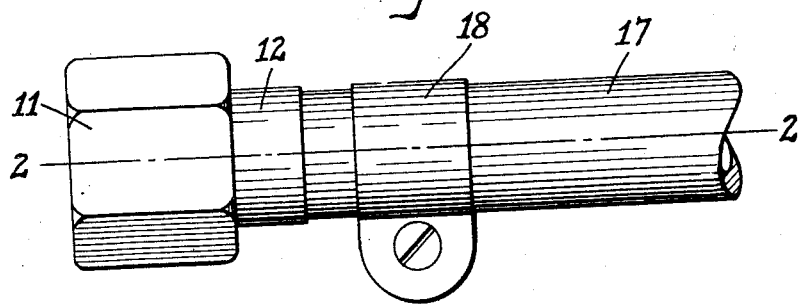
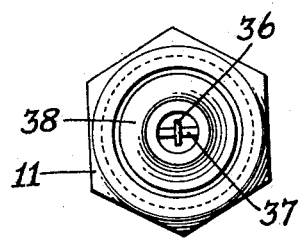
INVENTOR,
Roy W. Tadd
BY
A. K. Martell
ATTORNEY.

Patented Nov. 13, 1928.

1,691,364

UNITED STATES PATENT OFFICE.

ROY W. TADD, OF WALNUT PARK, CALIFORNIA.

VALVE CONNECTER FOR DELIVERY TUBES.

Application filed April 18, 1927. Serial No. 184,609.

My invention relates to hose fittings and more particularly to a valve connection for use on a supply hose or delivery tube.

The primary object of my invention is to provide a convenient fitting or connection for the apparatus end of a delivery tube, whereby it readily may be attached to or detached from a blowpipe or similar apparatus, supplied with a gas or liquid under pressure, from a source to which the other end of the delivery tube is connected.

A further object is to provide a connection, of the character described, equipped with a valve which automatically will shut off the gas or liquid supply when the delivery tube is disconnected from the apparatus, thereby minimizing waste, saving time and labor and securing protection to the operator.

Other objects and advantages will appear hereinafter, and while I show herewith and will describe a preferred form of construction, I do not desire to limit myself to such preferred form but that various changes and adaptations may be made therein without departing from the spirit of my invention as hereinafter claimed.

Referring to the drawings which accompany this specification and form a part thereof.

Fig. 1 is a side view of the apparatus end of a delivery tube equipped with my valve connection.

Fig. 2 is a sectional view of the tube and valve connection shown in Fig. 1, taken on line 2—2 of that figure.

Fig. 3 is a view in elevation of the valve connection shown in Fig. 1, looking into the open end thereof.

The fitting or connection is made up of several metallic parts including a valve-tube 10, a union-nut 11, a spacing sleeve 12, a shut-off valve 13, a contact-tube 14 and a seating spring 15. One end of valve tube 10 is made of a suitable size to serve as a nipple 16, upon which the hose 17, from a supply source is stretched and secured by a clamp 18 in the usual way, the usual annular grooves 19 being provided to insure against danger of the hose pulling off therefrom. The body part 20 of the valve-tube 10 is somewhat larger in diameter than nipple 16 so that an external annular shoulder 21 is formed at the junction point. An internal annular shoulder 22 is likewise formed between the bore 23 of body part 20 and reduced bore 24 of nipple 16. An enlarged bore 25, tapered into bore 23 so as to form a valve seat 26, is made in the free end of nipple 16 and the open end of bore 24, in body portion 20, is reamed out to form a seat 27. Body portion 20 is provided with a terminal flange 28 which form an external annular shoulder 29 adjacent the larger end of valve-tube 10.

Union-nut 11 is made with a hexagonal exterior, to serve as a wrench seat, and an internal bore 30 adapted to fit terminal flange 28, of valve tube 10. One end of union-nut 11 has a reduced bore to fit body portion 20, so that an internal flange 31 is formed thereon which is adapted to engage shoulder 29 of body portion 20 when union-nut 11 is slipped over nipple 16 onto body portion 20. Union-nut 11 is internally threaded, as at 32, to engage the threaded nipple of a blow-pipe or other apparatus to which it is to be connected. Spacing-sleeve 12 is slipped over body portion 20 of valve-tube 10, before nipple 16 is inserted into the hose, to hold union-nut 11 up against shoulder 29.

Cut-off valve 13 consists of a closure-disc 33 having a spherical seating face 34 adapted to rest on seat 26. It is equipped with a long slender stem 35 extending longitudinally through bore 24 of nipple 16 into bore 23 of body part 20. The inner end of contact-tube 14 telescopes freely within bore 23 of body part 20 and is connected to the flattened end 36 of stem 35 by a transverse pin 37 extending through said flattened end 36 and said contact-tube 14, as shown in Fig. 2. The other end of contact-tube 14 is equipped with a flanged head 38 and a seating face 39 adapted to contact with valve seat 27 of valve-tube 10. The beveled seating surface 39 of the valve head 38 is concentric to the axis of the contact tube 14, and the correspondingly beveled valve seat 27 is concentric to the bore 23 of the nipple body 16. Hence when head 38 is moved inwardly a sufficient distance to bring its beveled surface 39 into engagement with beveled seat 27, the contact tube 14 is accurately centered within bore 23. As shown in Fig. 2 said bore 23 is of slightly greater diameter than the portion of said contact tube 14 therewithin, therefore, the centering means which has just been described insures that said contact tube offers no frictional resistance to its outward movement for closure of the inner valve 33 after the pressure has removed from the head 38.

Valve-spring 15 is a helical spring surrounding stem 35 within bore 23 and is under compression between the inner end of contact-tube 14 and shoulder 22 of valve-tube 10. It will be seen that contact-tube 14 and closure-disc 33 are rigidly held in spaced relation to each other by stem 35 and that spring 15 operates to hold closure-disc 33 on its seat 26, except when pressure sufficient to overbalance the action of spring 15 is brought to bear against head 38 of contact-tube 14. This happens only when the hose or delivery tube is connected to an apparatus by screwing union-nut 11 onto the nipple thereof, whereupon the end of the nipple is brought into contact with head 38 so as to force contact-tube 14 inwardly until face 39 of head 38 rests on seat 27 of valve-tube 10, which action simultaneously lifts the cut-off valve from its seat and permits the gas or liquid to flow through the connection.

When work is to be suspended or the apparatus is to be disconnected for any reason it is only necessary to unscrew union nut 11 from the nipple, whereupon spring 15 acts to close the cut-off valve and the gas or liquid supply is automatically cut off, thus saving the time and labor involved in going to the supply source an dturning a valve there, as is usually necessary, and also saving the contents of the delivery tube, more or less of which is usually wasted. Furthermore, all danger of accidents due to leakage at the apparatus end of the delivery tube is eliminated by the use of this connection.

It is evident that my valve connection may be used with apparatus supplied with compressed air, oxygen and hydrogen, acetylene, illuminating gas or with any kind of liquid which is supplied under pressure through a delivery tube in the manner described.

Having thus illustrated and described my invention, I claim:

In a device of the character described, the combination, with the valve tube, and valve at the inner end of said tube; of a contact tube extending into the outer end portion of said valve tube and in axial alinement with the latter, the external diameter of the portion of said contact tube which is within said valve tube being slightly less than the internal diameter of the outer portion of said valve tube, there being co-operating beveled seating surfaces co-acting between said contact tube and valve tube to center said contact tube loosely and concentrically within the outer end of said valve tube, and a connecting rod connecting together said contact tube and valve.

ROY W. TADD.